United States Patent Office 3,784,669
Patented Jan. 8, 1974

3,784,669
RECOVERY OF METAL VALUES FROM CHROME ETCHING SOLUTIONS
Carl H. Elges III, Philip R. Haskett, Donald J. Bauer, and Roald E. Lindstrom, Reno, Nev., assignors to the United States of America as represented by the Secretary of the Interior
No Drawing. Filed Oct. 3, 1972, Ser. No. 292,232
Int. Cl. C01g *3/02, 37/02*
U.S. Cl. 423—43    5 Claims

ABSTRACT OF THE DISCLOSURE

Chromium and copper are recovered, as oxides, from spent chrome etching solutions by means of a process comprising the steps of: (1) addition of a reducing sugar to reduce Cr(VI) to Cr(III) and to complex Cr(III) and Cu values in solution, (2) addition of base to raise the pH to a value of about 10 to 12, to reduce the copper and precipitate it as $Cu_2O$, (3) separating the precipitated $Cu_2O$, (4) heating the remaining solution at a temperature of about 50 to 70° C. for a period sufficient to break the Cr(III) complex, and (5) adjusting the pH of the solution to a value of about 6 to 9 to precipitate the chromium as hydrous chromium oxide.

---

Chrome etching solutions are extensively used in processing copper or copper alloys, such as brass. These solutions, the active ingredient of which is chromic acid, usually consist essentially of an aqueous solution of sodium dichromate and sulfuric acid, and generally have a pH of about zero to 1.

Spent chrome etching solutions, from treatment of copper or copper alloys, contain Cr(VI) (hexavalent chromium), Cr(III) (trivalent chromium) and Cu(II) (cupric copper), typically in concentrations of about 50 to 70 g./l. of chromium and about 20 to 40 g./l. of copper. These spent solutions are usually discarded by injection into disused oil wells or by pumping into municipal dumping areas, and are in an active form for severe ground water pollution. Small amounts of the solution are used in tanning leather, but this utilization is negligible compared to the supply.

It has now been found that chromium and copper may be recovered, in the form of oxides, from the spent etching solutions by means of a process in which the spent solution is initially treated with a reducing sugar to reduce Cr(VI) to Cr(III), to complex Cr(III) and copper in solution, and to provide an excess of reducing agent. Copper is then precipitated as $Cu_2O$ by addition of sufficient base to raise the pH of the solution to about 10 to 12. After separation of the precipitated $Cu_2O$, the solution is heated to eliminate the reducing agent, and chromium is then precipitated as the hydrous oxide by adjustment of the pH to about 6 to 9. By means of this procedure, both chromium and copper values are salvaged from the spent etching solution, which can then be disposed of without presenting a pollution problem. In addition, the process provides an efficient separation of the chromium and copper values from each other.

The sugar may be any reducing sugar that is soluble in the spent etching solution, such as sucrose, glucose, maltose, etc. As discussed above, the function of the sugar is to effect initial reduction of the Cr(VI) to Cr(III), and, in a subsequent step, reduction of cupric copper to cuprous. In addition, it is believed that the process of the invention involves formation of a complex with the Cr(III) and the cupric copper, thus permitting separate precipitation of the metals when the pH is adjusted to the appropriate value. The complexing agent is believed to be a degradation product of the reducing sugar and is formed by oxidation of the sugar by the Cr(VI). This degradation product-complexing agent serves to keep the Cr(III) in solution when the copper is precipitated as $Cu_2O$.

The reducing sugar is added in an amount sufficient for initial reduction of the Cr(VI) to Cr(III) and for subsequent reduction of cupric copper to cuprous copper. These reactions are essentially stoichiometric and the amount of sugar will, therefore, depend on the amounts of Cr(VI), Cr(III) and copper in the spent etching solution. For most efficient results, however, it is usually desirable to use about 2 to 4 times the stoichiometric amount required for the total metal values present. This will usually require the use of about 3 to 5 moles of sugar per liter of spent etching solution.

Temperature, pressure, and reaction time are not critical in the treatment of the spent etching solution with the sugar, ambient conditions of temperature and pressure usually being satisfactory. A reaction time of about 20 to 30 minutes is generally sufficient.

Base is then added to raise the pH of the solution to a value of about 10 to 12, preferably about 11.5. Sodium hydroxide is the preferred base, but other strong bases may also be used. Again, ambient conditions of temperature and pressure and usually satisfactory. This results in precipitation of the copper as $Cu_2O$, which is then removed from the solution by any conventional means such as filtration.

The remaining solution is then heated to a temperature of about 50 to 80° C., and is held at this temperature for a period of about 5 to 10 minutes in order to destroy the complexing agent holding the chromium in solution. The solution is then cooled to ambient temperature and the pH adjusted to about 6 to 9, preferably about 7, by addition of acid. The preferred acid is sulfuric, but other acids such as hydrochloric or nitric may also be used. This results in precipitation of the chromium as the hydrous oxide. Again, the precipitate is removed by filtration or other conventional means.

Recovery of chromium and copper from the respective oxides may be readily accomplished by means of conventional processes such as hydrogen reduction of the $Cu_2O$ and conversion of chromium oxide to ferro-chrome. Or, the metals may be utilized directly in the form of their oxides for a variety of conventional uses such as pigments, ceramics, catalysts, glasses, electroplating, fungicides, etc.

The invention will be more specifically illustrated by means of the following examples.

EXAMPLE 1

Twenty-five grams of a spent etching solution containing copper (30 g./l.), chromium(VI) (30 g./l.), and chromium(III) (30 g./l.) was treated with 5 grams of sucrose and stirred at ambient temperature for 24 hours. The pH was then adjusted to 11.5 (from about 1.2) by the addition of NaOH. Cuprous oxide precipitated and was filtered from the solution. The copper oxide product analyzed less than 0.1 percent chromium, and the filtrate contained only 5 p.p.m. copper. The chromium in solution was then precipitated by heating the solution to a temperature of 60° C. for a period of 10 minutes to destroy the complexing agent, and adjusting the pH to 7 with $H_2SO_4$. The precipitate analyzed greater than 99.9 percent hydrous chromium oxide and the solution contained about 100 p.p.m. chromium(III).

EXAMPLES 2–8

The procedure of Example 1 was repeated except that the amount of sucrose was varied. Results are shown in Table 1.

TABLE 1

| Example: | Sucrose added, g. | Cr(VI) in solution, g./l. | Cr(III) in solution, g./l | Cr in Cu ppt., percent |
|---|---|---|---|---|
| 2 | 0.0 | 30.0 | 30 | |
| 3 | .4 | 10.0 | 50 | |
| 4 | .6 | 0.1 | 60 | |
| 5 | .8 | <0.1 | 60 | 32.0 |
| 6 | 2.0 | <0.1 | 60 | 0.6 |
| 7 | 4.0 | <0.1 | 60 | <0.2 |
| 8 | 5.0 | <0.1 | 60 | <0.1 |

Although 0.6 g. of sucrose was sufficient to reduce all of the chromium(VI) to chromium(III), this amount was not sufficient to insure separation of chromium from copper. A greater amount of sucrose (2–5 grams) was required for a 99+ percent copper oxide product.

EXAMPLE 9

The procedure of Example 1 was repeated except that the amount of base added to precipitate the $Cu_2O$ was varied. Adding 5 grams of NaOH precipitated all but 280 p.p.m. of copper from the solution, whereas 7 grams of NaOH precipitated all but 60 p.p.m. The optimum amount of base, therefore, depends on the degree of copper precipitation required as well as the initial acid content of the etching solution.

We claim:

1. A method for recovery of chromium and copper, as oxides, from a spent chrome etching solution comprising the steps of: (1) treating the spent solution with a reducing sugar to reduce hexavalent chromium to the trivalent state, and to complex chromium and copper values in the solution, (2) adding base to raise the pH of the solution to about 10 to 12, thereby precipitating copper as cuprous oxide, (3) separating the precipitated cuprous oxide, (4) heating the remaining solution to a temperature of about 50 to 70° C. for a period of about 5 to 10 minutes, in order to break the chromium complex and (5) adjusting the pH of the solution to about 6 to 9, to precipitate the chromium as hydrous chromium oxide.

2. The method of claim 1 in which the reducing sugar is sucrose.

3. The method of claim 2 in which the sucrose is employed in an amount of about 3 to 5 moles per liter of the spent etching solution.

4. The method of claim 1 in which the pH of the solution is adjusted to about 11.5 by addition of sodium hydroxide to precipitate the cuprous oxide.

5. The method of claim 1 in which the solution is heated to a temperature of about 50 to 70° C. prior to precipitation of the hydrous chromium oxide.

References Cited

UNITED STATES PATENTS

| 409,336 | 8/1889 | Rappe | 423—55 |
| 1,592,173 | 8/1926 | Bardt | 75—117 |
| 1,893,761 | 1/1933 | Caspari | 423—607 |
| 2,733,204 | 1/1956 | Costa | 423—54 |
| 3,493,328 | 2/1970 | Nieuwenhuis | 423—56 |
| 3,531,262 | 9/1970 | Dougherty | 423—24 |
| 3,681,056 | 8/1972 | Lyon et al. | 75—108 |

HERBERT T. CARTER, Primary Examiner

E. T. WHEELOCK, Assistant Examiner

U.S. Cl. X.R.

423—55; 210—42, 50